Aug. 23, 1955    C. K. MOUSEL    2,715,866
NON-GLARE VEHICLE WINDOW VENTILATOR
Filed Feb. 19, 1952
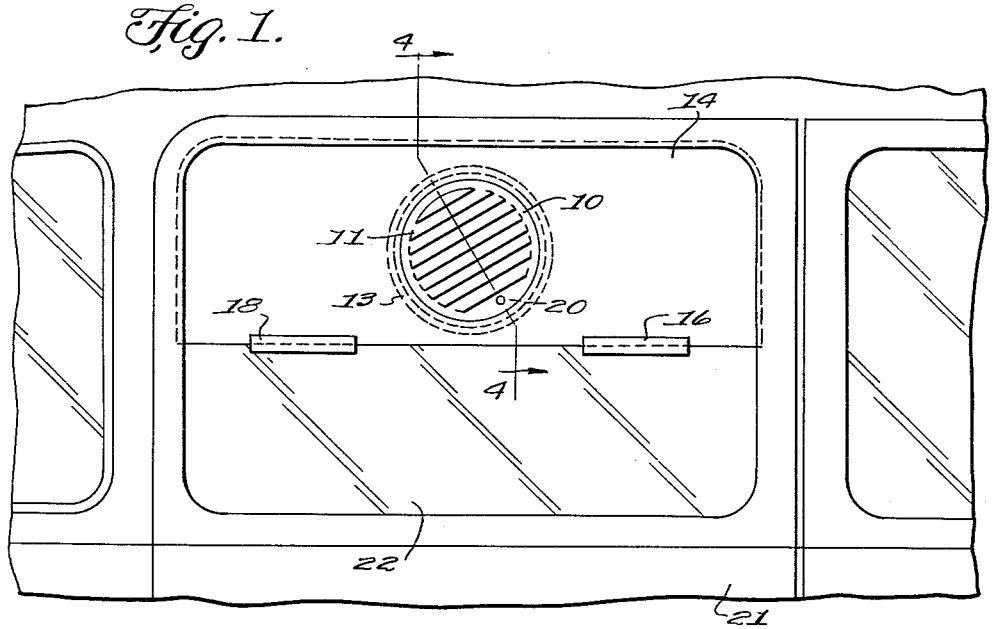
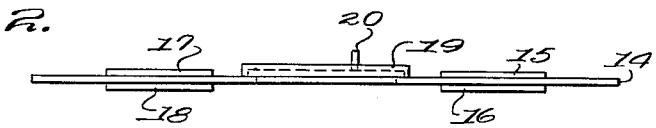
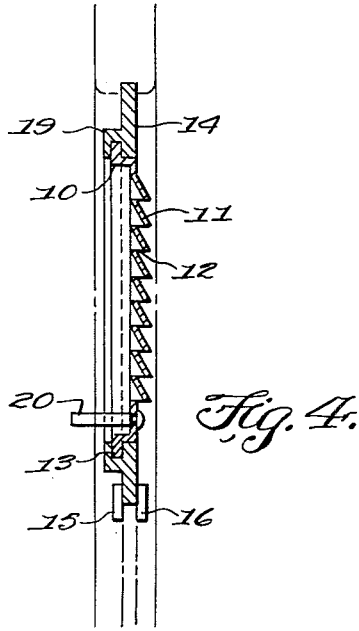
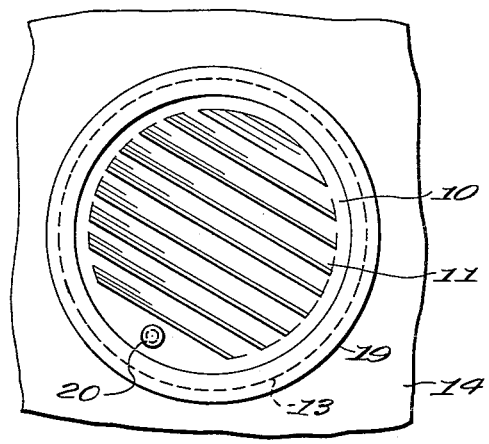
INVENTOR.
Canellen K. Mousel,
BY Victor J. Evans & Co.
ATTORNEYS

United States Patent Office 2,715,866
Patented Aug. 23, 1955

2,715,866

NON-GLARE VEHICLE WINDOW VENTILATOR

Canellen K. Mousel, Edison, Nebr.

Application February 19, 1952, Serial No. 272,302

1 Claim. (Cl. 98—2)

This invention relates to ventilating devices used in windows particularly of doors of motor vehicles of the pleasure type, and in particular a circular plastic disc having louvers extended across the disc and a panel in which the disc is journaled whereby with the panel positioned in an opening above a glass panel of a motor vehicle door the disc may be turned to regulate the amount of air taken into the vehicle and, with the device colored, glare is eliminated.

The purpose of this invention is to provide a ventilator for a window of a motor vehicle in which glare is eliminated and in which the device is readily positioned to regulate the amount of air entering the vehicle body.

Various types of devices have been provided for use in combination with windows in the doors of motor vehicles for ventilating the interior of a vehicle, however, with the conventional type of ventilator it is difficult to regulate the air entering or leaving the vehicle body without forming the device with moving parts which rattle or cause objectionable noise. With this thought in mind this invention contemplates a mounting panel having a plurality of parallel louvers carried by a disc positioned to rotate in the panel whereby the device may be turned whereby the louvers scoop in air, or withdraw air from the interior of the body of the vehicle by suction, or may be set in a neutral position whereby the amount of air passing through the device is substantially negligible.

The object of this invention is, therefore, to provide means for forming a ventilator for motor vehicle bodies in which the amount of air taken into the body or removed therefrom may be controlled without moving parts.

Another object of the invention is to provide a ventilator for motor vehicle bodies that is adjustable to regulate the amount of air entering or leaving the body and that may be used in vehicles now in use without changing the parts thereof.

A further object of the invention is to provide an adjustable ventilator for motor vehicle bodies which is of a simple and economical construction.

With these and other objects and advantages in view the invention embodies a panel, preferably of plastic or a suitable transparent material, and a disc having louvers therein rotatably mounted in a circular track in the panel.

Other features and advantages of the invention will appear from the following description taken in connection with the drawings wherein:

Figure 1 is a view showing a side elevation of part of the motor vehicle body illustrating the improved ventilator positioned in one of the doors of the vehicle.

Figure 2 is a plan view looking downwardly upon the upper edge of the panel in which the ventilator is mounted.

Figure 3 is a side elevational view of the ventilator with the parts shown on an enlarged scale.

Figure 4 is a cross section taken on line 4—4 of Fig. 1 illustrating the construction of the ventilator and also showing the parts on an enlarged scale.

Referring now to the drawing wherein like reference characters denote corresponding parts the improved motor vehicle body ventilator of this invention includes a disc 10, having a rim Z-shaped in cross section, louvers 11 extended across the disc and having open slots 12 between the louvers, an annular slot 13 in which the peripheral edge of the disc is positioned and a panel 14 adapted to be inserted in the upper part of the door of a motor vehicle and in which the channel or slot 13 is positioned.

The panel 14 is provided with depending clips 15 and 16 at one side and 17 and 18 at the other and the channel or slot 13 is provided in a boss 19 extended from one side of the panel.

The disc 10 is provided with a knob or handle 20 by which it may readily be moved in the slot or channel 13 to adjust the position of the louvers 11.

With the parts arranged in this manner the panel 14 with the disc 10 therein is positioned in the glass channel in the upper part of a motor vehicle door, which is indicated by the numeral 21 and with the conventional glass panel 22 of the door lowered, the panel 14 is inserted in the glass channel in the upper part of the door with the clips on the lower edge thereof positioned over the edge of the panel 22 so that as the panel 22 is raised the panel 14 will be secured in the glass channel of the door.

With the device in position the disc 10 may be rotated in the slot 13 until the louvers slope so that air will be scooped into the body of the vehicle as the vehicle moves forwardly, or by reversing the positions of the louvers air passing over the louvers will create a vacuum drawing air from the body of the vehicle.

By this means fresh air may be supplied to the body of the vehicle or the air in the vehicle may be drawn therefrom, or the device may be actuated to an intermediate position where the air blown into the vehicle corresponds with the air drawn therefrom so that the action of the device is substantially equalized.

The disc and also the panel 14 may be formed of plastic or other suitable material and the parts may be provided in different colors.

It will be understood that modifications may be made in the design and arrangement of the parts without departing from the spirit of the invention.

What is claimed is:

In a vehicle window ventilating panel, the combination which comprises a substantially rectangular-shaped panel of at least partially transparent material having pairs of depending clips on the lower edge adapted to retain the panel on the upper edge of a window pane with the upper part of the panel secured in a frame in which the window pane is positioned, said panel having a circular opening therein and having an annular channel extended around said opening, a disc having a rim, Z-shaped in cross section, positioned in the opening of the panel and having spaced parallel louvers therein, and a knob extended from the inner surface of the disc providing a handle for turning the disc to adjust the angular position of said louvers.

References Cited in the file of this patent

UNITED STATES PATENTS

| | | |
|---|---|---|
| 496,199 | Hayward et al. | Apr. 25, 1893 |
| 1,660,893 | Smith | Feb. 28, 1928 |
| 1,685,902 | Bloomer et al. | Oct. 2, 1928 |
| 1,733,025 | Lovell | Oct. 22, 1929 |
| 2,029,406 | Birkholz | Feb. 4, 1936 |
| 2,178,894 | Morgan | Nov. 7, 1939 |
| 2,286,584 | Simcox | June 16, 1942 |
| 2,472,748 | Labus | June 7, 1949 |
| 2,628,549 | Stelmach | Feb. 17, 1953 |